United States Patent
Leng et al.

(10) Patent No.: US 12,408,085 B2
(45) Date of Patent: Sep. 2, 2025

(54) METHOD AND APPARATUS FOR CONDITIONAL PSCell ADDITION AND CHANGE

(71) Applicant: Samsung Electronics Co., Ltd., Suwon-si (KR)

(72) Inventors: Shiyang Leng, Allen, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 18/156,381

(22) Filed: Jan. 18, 2023

(65) Prior Publication Data

US 2023/0247492 A1 Aug. 3, 2023

Related U.S. Application Data

(60) Provisional application No. 63/305,894, filed on Feb. 2, 2022, provisional application No. 63/305,902, filed on Feb. 2, 2022.

(51) Int. Cl.
*H04W 28/26* (2009.01)
*H04W 36/26* (2009.01)
*H04W 48/20* (2009.01)

(52) U.S. Cl.
CPC .......... *H04W 28/26* (2013.01); *H04W 36/26* (2013.01); *H04W 48/20* (2013.01)

(58) Field of Classification Search
CPC ..... H04W 28/26; H04W 36/26; H04W 48/20; H04W 36/0072; H04W 36/0077; H04W 36/00837; H04W 36/362; H04W 36/0069
See application file for complete search history.

(56) References Cited

U.S. PATENT DOCUMENTS

| | | |
|---|---|---|
| 2021/0007168 A1 | 1/2021 | Asterjadhi et al. |
| 2021/0099926 A1 | 4/2021 | Chen et al. |

(Continued)

FOREIGN PATENT DOCUMENTS

| | | |
|---|---|---|
| TW | 202139749 A | 10/2021 |
| WO | 2021107685 A1 | 6/2021 |
| WO | 2021180541 A1 | 9/2021 |

OTHER PUBLICATIONS

International Search Report and Written Opinion issued May 3, 2023 regarding International Application No. PCT/KR2023/001491, 7 pages.

(Continued)

*Primary Examiner* — Khoa Huynh

(57) ABSTRACT

Methods and apparatuses for enhanced conditional PCell/PSCell addition and changes in a wireless communication system. A method of a UE comprises: receiving reservation information including an indication; determining, based on the indication, whether a candidate PCell/PSCell is reserved; storing, based on a determination that the candidate PCell/PSCell is reserved, the reservation information, CG information and one or more execution conditions associated with the reserved PCell/PSCell; retrieving, after performing a first UE operation, the stored CG information and one or more execution conditions associated with the reserved PCell/PSCell; determining whether one or more execution conditions are met for a reserved PCell/PSCell; and upon determination that one or more execution conditions are met, applying the stored the CG information of the reserved PCell/PSCell to a second UE operation.

20 Claims, 10 Drawing Sheets

(56) References Cited

U.S. PATENT DOCUMENTS

| | | | |
|---|---|---|---|
| 2021/0274587 A1 | 9/2021 | Jung et al. | |
| 2022/0022067 A1* | 1/2022 | Kim | H04L 5/0098 |
| 2022/0029736 A1 | 1/2022 | Chu et al. | |
| 2022/0030483 A1* | 1/2022 | Cheng | H04W 36/00838 |
| 2022/0030498 A1 | 1/2022 | Futaki et al. | |
| 2022/0418018 A1 | 12/2022 | Jang et al. | |
| 2023/0063931 A1* | 3/2023 | Damnjanovic | H04W 36/00698 |
| 2023/0111427 A1 | 4/2023 | Zhang et al. | |
| 2024/0147340 A1* | 5/2024 | Zhang | H04W 36/0069 |

OTHER PUBLICATIONS

LG Electronics Inc., "Conditional resumption with validity check", 3GPP TSG-RAN WG2 Meeting #107bis, R2-1913918, Oct. 2019, 3 pages.

CATT, "Considerations on parallel Configuration between MeNB and SeNB", 3GPP TSG-RAN WG2 Meeting #87bis, R2-144358, Sep. 2014, 5 pages.

International Search Report and Written Opinion issued May 1, 2023 regarding International Application No. PCT/KR2023/001276, 9 pages.

Seok et al., "PDT Hybrid EMLSR Mode", doc.: IEEE 802.11-21/1895r0, Dec. 2021, 4 pages.

"3rd Generation Partnership Project; Technical Specification Group Radio Access Network; NR; Medium Access Control (MAC) protocol specification (Release 17)", 3GPP TS 38.321 V17.0.0, Mar. 2022, 221 pages.

"3rd Generation Partnership Project; Technical Specification Group Radio Access Network; NR; Radio Resource Control (RRC) protocol specification (Release 17)", 3GPP TS 38.331 V17.0.0, Mar. 2022, 1221 pages.

Extended European Search Report issued Apr. 4, 2025 regarding Application No. 23749956.1, 10 pages.

\* cited by examiner

METHOD AND APPARATUS FOR CONDITIONAL PSCell ADDITION AND CHANGE

CROSS-REFERENCE TO RELATED APPLICATIONS AND CLAIM OF PRIORITY

The present application claims priority to U.S. Provisional Patent Application No. 63/305,894, filed on Feb. 2, 2022, and U.S. Provisional Patent Application No. 63/305,902, filed on Feb. 2, 2022. The contents of the above-identified patent documents are incorporated herein by reference.

TECHNICAL FIELD

The present disclosure relates generally to wireless communication systems and, more specifically, the present disclosure relates to enhanced conditional primary cell or secondary cell (PCell/PSCell) addition and changes in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to enhanced conditional PCell/PSCell addition and changes in a wireless communication system.

In one embodiment, a UE in a wireless communication system, the UE comprises a transceiver configured to receive reservation information including an indication. The UE further comprises a processor operably coupled to the transceiver, the processor configured to: determine, based on the indication, whether a candidate PCell/PSCell is reserved, store, based on a determination that the candidate PCell/PSCell is reserved, the reservation information, cell group (CG) information, and one or more execution conditions associated with the reserved PCell/PSCell, retrieve, after performing a first UE operation, the stored CG information and one or more execution conditions associated with the reserved PCell/PSCell, determine whether one or more execution conditions are met for a reserved PCell/PSCell, and upon determination that one or more execution conditions are met, apply the stored the CG information of the reserved PCell/PSCell to a second UE operation.

In another embodiment, a method of UE in a wireless communication system the method of UE comprises: receiving reservation information including an indication; determining, based on the indication, whether a candidate PCell/PSCell is reserved; storing, based on a determination that the candidate PCell/PSCell is reserved, the reservation information, CG information and one or more execution conditions associated with the reserved PCell/PSCell; retrieving, after performing a first UE operation, the stored CG information and one or more execution conditions associated with the reserved PCell/PSCell; determining whether one or more execution conditions are met for a reserved PCell/PSCell; and upon determination that one or more execution conditions are met, applying the stored the CG information of the reserved PCell/PSCell to a second UE operation.

In yet another embodiment, a base station (BS) in a wireless communication system, the BS comprises a processor configured to generate an indication indicating whether a candidate PCell/PSCell is reserved. The BS further comprises a transceiver configured to transmit reservation information including the indication, wherein: based on the indication indicating that the candidate PCell/PSCell is reserved, the reservation information, CG information, and one or more execution conditions associated with the reserved PCell/PSCell are stored by a UE, after performing a first UE operation, the stored CG information and one or more execution conditions associated with the reserved PCell/PSCell are retrieved, when one or more execution conditions are met for a reserved PCell/PSCell, the stored the CG information of the reserved PCell/PSCell is applied to a second UE operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
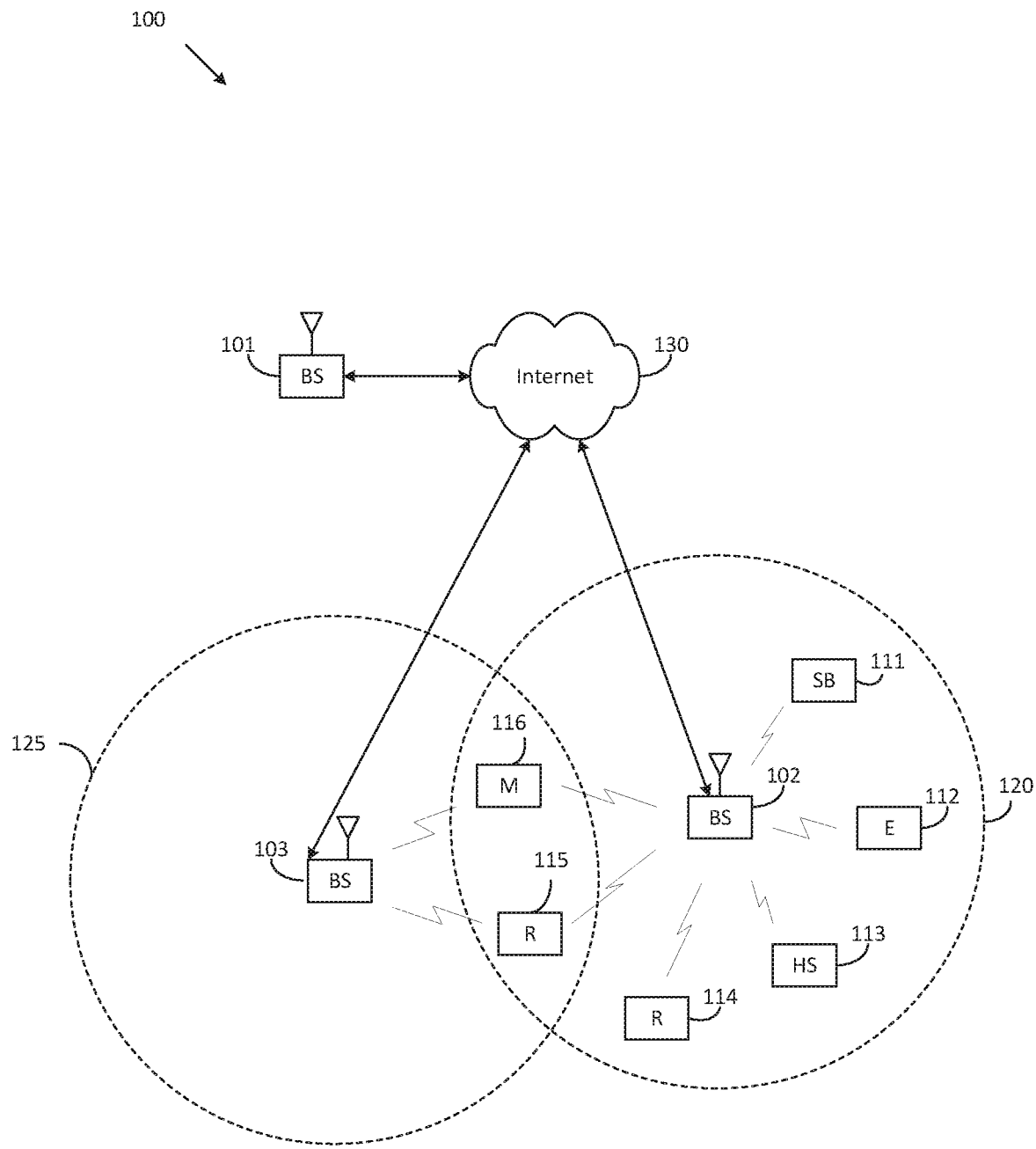
FIG. 1 illustrates an example of wireless network according to embodiments of the present disclosure.
Figure 2:
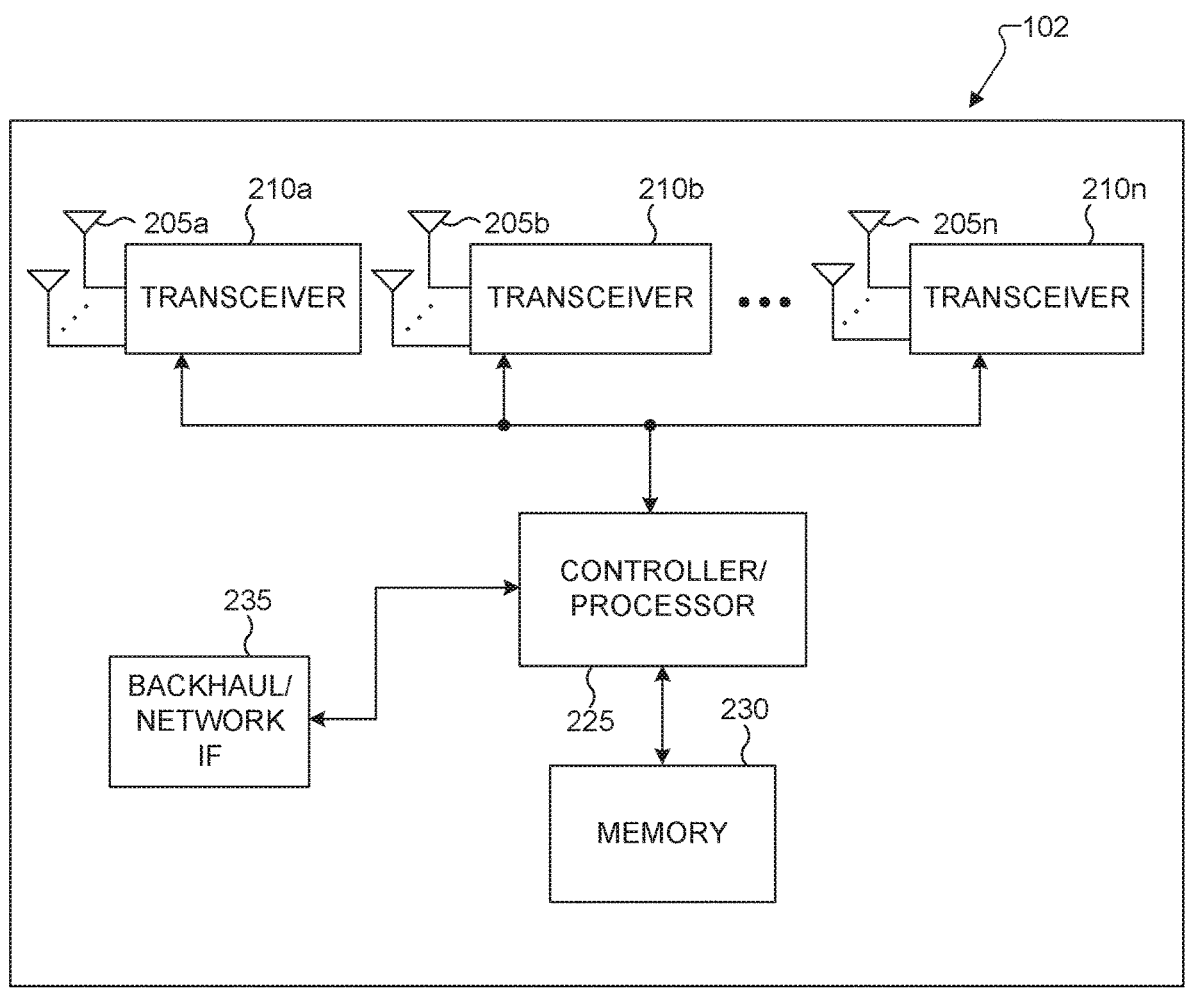
FIG. 2 illustrates an example of gNB according to embodiments of the present disclosure.
Figure 3:
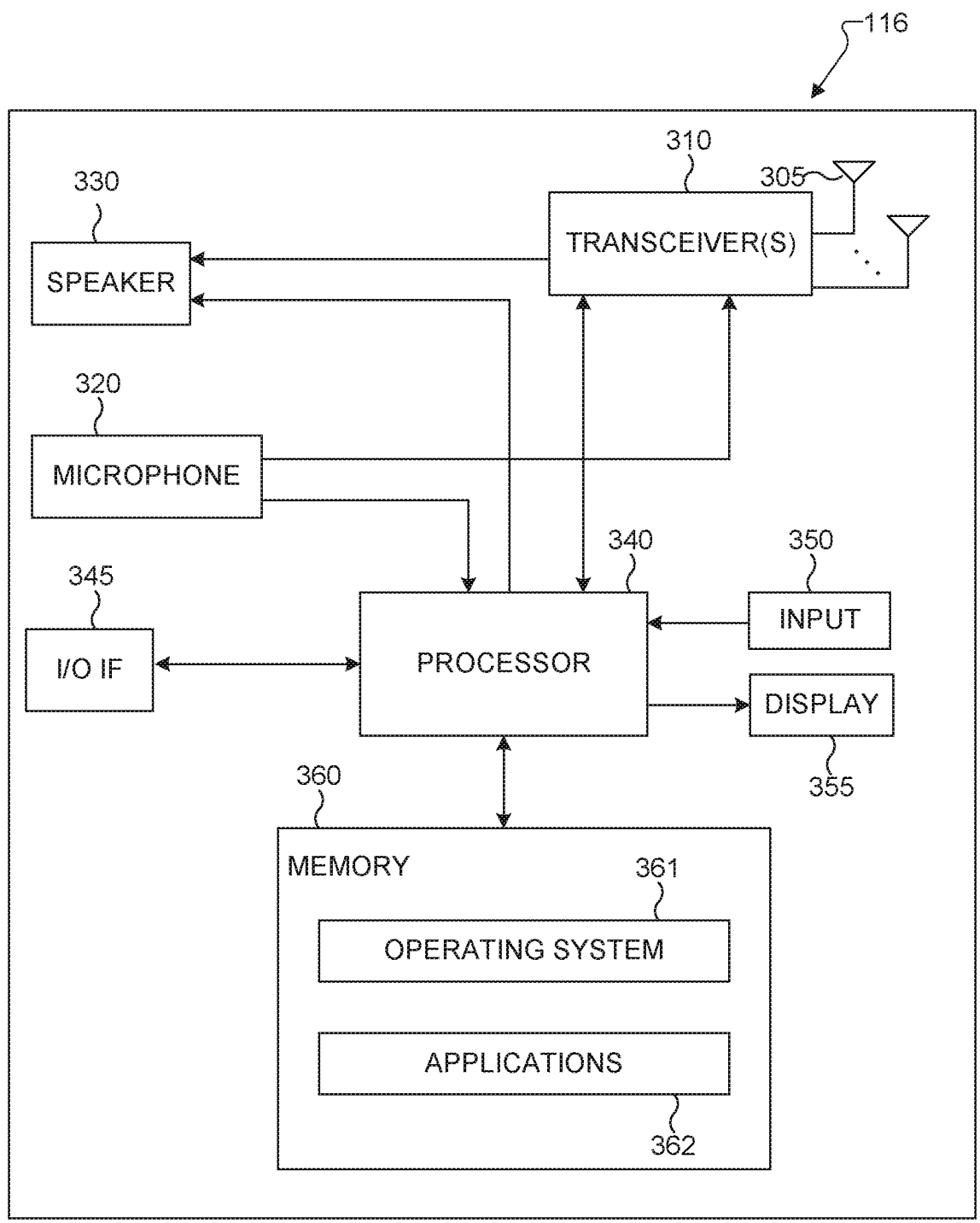
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for enhanced conditional PCell/PSCell addition and changes in a wireless communication system. In certain embodiments, and one or more of the gNBs 101-103 includes circuitry, programing, or a combination thereof, for enhanced conditional PCell/PSCell addition and changes in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes for enhanced conditional PCell/PSCell addition and changes in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for enhanced conditional PCell/PSCell addition and changes in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
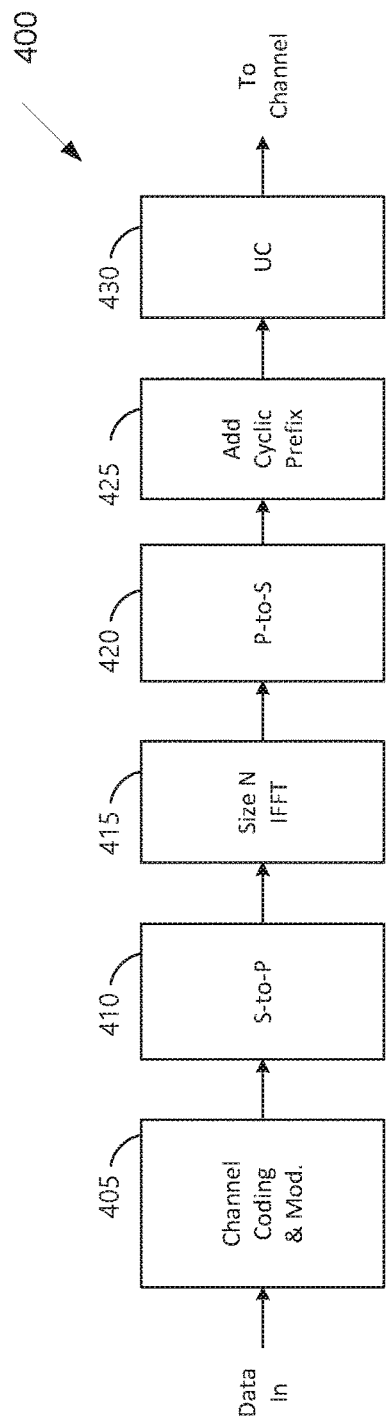
FIGS. 4 and 5 illustrate example of wireless transmit and receive paths according to this disclosure.
Figure 5:
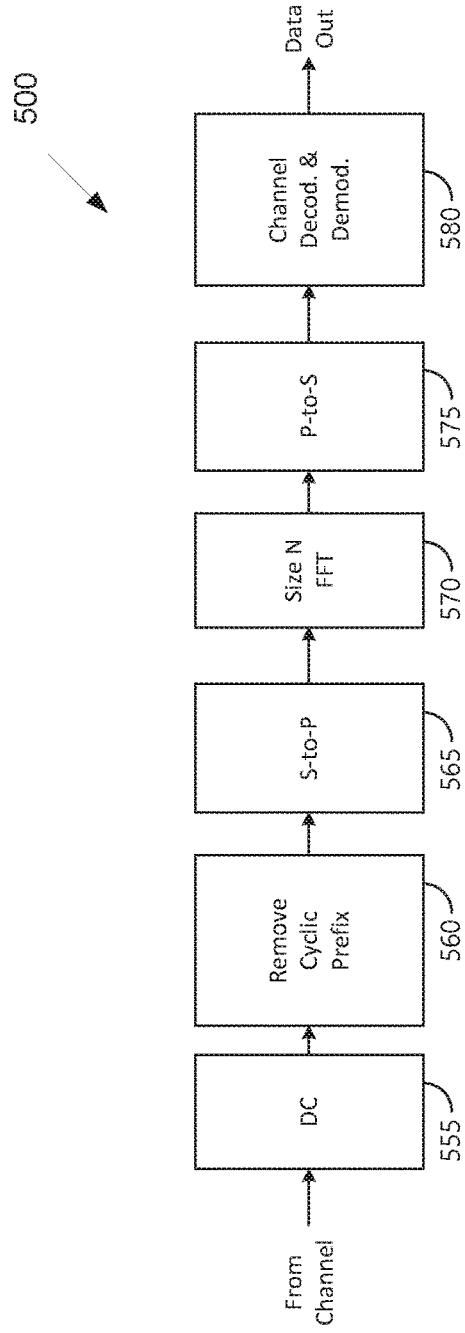

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

3GPP has developed technical specifications and standards to define the new 5G radio-access technology, known as 5G NR. Mobility handling is a critical aspect in any mobile communication system including 5G system. For a UE in a connected mode, mobility is controlled by the network with the assistance from the UE to maintain a good quality of connection. Based on the measurement on radio link quality of the serving cell and neighboring cell(s) reported by the UE, the network may handover the UE to a neighboring cell that can provide better radio conditions when the UE is experiencing a degraded connection to the serving cell.

In release-15 NR, the basic mechanism and procedure of network-controlled mobility in connected mode is developed. In release-16 NR, enhancements to network-controlled mobility in connected mode are introduced to mitigate connection interruption during handover procedure, among which is the conditional handover (CHO). In a CHO procedure, upon receiving a CHO configuration in an RRC reconfiguration message which contains configuration for multiple candidate cells, a UE starts to evaluate the CHO execution conditions for the candidate cell(s). If at least one CHO candidate cell satisfies the corresponding CHO execution condition, the UE detaches from the source cell, applies configuration and synchronizes to the target cell and completes the CHO procedure by sending RRC reconfiguration complete message to the target gNB. The UE releases stored CHO configurations after successful completion of handover procedure.

To improve system performance and tightly link to LTE networks, another useful feature supported in 5G networks is dual connectivity (DC). In a DC operation, a multiple Rx/Tx capable UE can be configured to communicate with two different nodes, known as a master node (MN) serving a master cell group (MCG) and a secondary node (SN) serving a secondary cell group (SCG). The MN and the SN are connected via non-ideal backhaul, where one node provides NR access and the other one provides either E-UTRA or NR access. The UE camps on a primary cell (PCell) from the MCG and connects to a primary SCG cell (PSCell) from the SCG.

The MN and SN may be a base station as illustrated in FIG. 1 (e.g., 101-103).

The UE establishes connection to a SN by SN addition/change procedure or conditional PSCell addition/change (CPA/CPC) procedure where the CHO principle is applied to hand over the UE from the serving PSCell to a target PSCell intra-SN or inter-SN. Similarly, the UE may release CPA/CPC configuration upon successful CPA/CPC execution, i.e., after the UE completes the random access procedure to the target PSCell and has sent RRC reconfiguration complete message to the MN. However, when successive CPC is needed for UE moving fast, MN/SN may reinitiate the procedure via inter-node message exchange and reconfigure CPC by sending RRC reconfiguration message to the UE. This slows down successive PSCell change and causes connection interruption to the SN(s).

To reduce interruption in CPA/CPC and enable fast change of PSCell, the CPA/CPC procedure for L3-based mobility needs to be enhanced.

In the present disclosure, an enhanced CPA/CPC procedure and relevant signaling are provided. Specifically, SCG reservation and selection are provided where the CPA/CPC configuration for the some PSCells and the configuration for the associated SCGs are reserved and can be selected dynamically so that the CPA/CPC configuration can be applied by the UE for fast SCG change without full release and reconfiguration. Similar mechanism is also introduced to CHO, i.e., the configuration associated with a set of candidate target PCells can be reserved to reduce signaling overhead.

Figure 6:
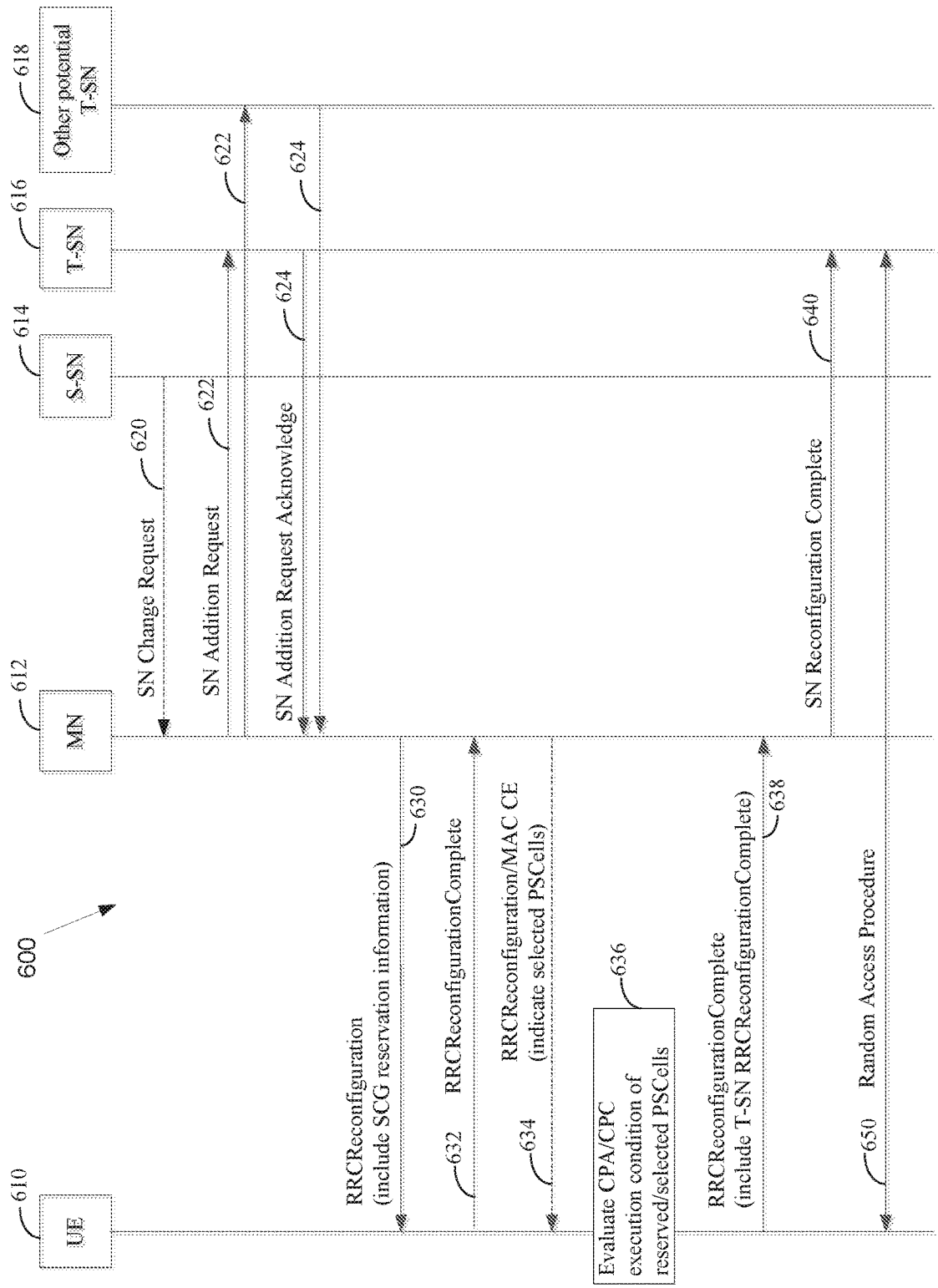
FIG. 6 illustrates a signaling flow for enhanced conditional PSCell addition/change according to embodiments of the present disclosure.

FIG. 6 illustrates a signaling flow of method 600 for enhanced conditional PSCell addition/change according to embodiments of the present disclosure. The method 600 as may be performed by a UE (e.g., 111-116 as illustrated in FIG. 1) and a BS (e.g., 101-103 as illustrated in FIG. 1). An embodiment of the method 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, the enhanced CPC can be initiated by the MN 612 or the source SN 614. If the source SN 614 initiates the CPC procedure, a SN change request message 620 is sent to the MN 612. The message contains a candidate target node ID and may include the SCG configuration. The message also includes a list of proposed PSCell candidates recommended by the source SN 614, including execution conditions, and may also include the SCG measurement configurations for CPC.

If the MN 612 initiates the CPA/CPC procedure, the SN change request message 620 is omitted. The MN 612 initiates the CPC by sending the SN addition request message 622 to the target SN 616 and other potential SN 618 to request resource allocation for the UE 610. The MN may include measurement results related to the target SN 616/618 and indicates the list of PSCells that may be prepared by the MN 612. Within the list of PSCells indicated by the MN 612, the target SN 616/618 decides the list of PSCell(s) to prepare and, for each prepared PSCell, the target SN 616/618 decides other SCG secondary cells (SCells) and provides the corresponding SCG configuration to the MN 612 by sending the SN addition request acknowledge message 624.

At 630, the MN 612 sends an RRC reconfiguration message to the UE 610 including the CPA/CPC configuration of candidate PSCells, i.e., the associated execution conditions and the encapsulated RRC reconfiguration messages received from the target SN 616 and potential target SN 618. Besides, the RRC reconfiguration message can also include the current MCG updated configuration, e.g., to configure the required conditional measurements. From the candidate PSCells, multiple PSCells can be reserved, e.g., based on PSCell measurement results, by the MN or by the associated target SN with the other node informed in SN addition request message 622 and/or SN addition request acknowledge message 624.

For example, each candidate PSCells can be indicated as Reserved or Unreserved by a one-bit indication. In another example, a list of PSCell identities, e.g., PscellReservedId, can be used to indicate the reserved PSCells. In one more example, the reserved PSCells are configured in a manner of addition/modification/release by introducing new RRC IEs, e.g., PscellToAddModList and PscellToReleaseList.

Alternatively, a reserved PSCell can be marked by condReconfigId contained in the CPA/CPC configuration, i.e., a list of condReconfigId can be indicated as Reserved and the associated PSCell configurations are reserved implicitly, or a list of condReconfigId can be maintained in a manner of addition/modification/release and the associated PSCell configurations are maintained in the same way implicitly. The PSCell reservation configuration can be either contained in the RRC reconfiguration message from the MN if reserved cells are determined by the MN or contained in the encapsulated RRC reconfiguration messages from the target SNs if reserved cells are determined by the target SNs.

At 632, the UE 610 applies the RRC configuration excluded the CPA/CPC configuration, stores the CPA/CPC configuration and replies to the MN 612 with an RRC reconfiguration complete message without any SN RRC response messages. If a candidate PSCell is indicated as a reserved PSCell, the UE stores the CPA/CPC configuration of the reserved PSCell and the configuration of the associated SCG, where a new UE variable, e.g., VarReservedPscellConfig, can be introduced to store the configuration. In one example, the variable includes a list of reserved PSCells, and each entry of the list can include the information for one candidate PSCell, which can contain the PSCell ID, the PSCell and corresponding SCG configuration, and the execution conditions.

At 636, the UE 610 starts evaluating the execution conditions. If the execution condition of one candidate PSCell is satisfied, the UE applies an RRC configuration corresponding to the selected candidate PSCell, and sends an RRC reconfiguration complete message 638 to the MN 612, including an RRC reconfiguration complete message to the selected candidate PSCell served by the target SN 616 and the selected PSCell information to the MN 612.

At 640, the MN 612 informs the target SN 616 via SN reconfiguration complete message. At 650, the UE 610 performs random access procedure and synchronizes to the target SN 616.

Once a CPA/CPC procedure is performed successfully, the UE can retrieve the CPA/CPC configuration of the reserved PSCells and the configuration of the associated SCGs from the stored variable and perform subsequent CPA/CPC operation without re-initiation or reconfiguration. The PSCell reservation configuration can be maintained at the UE to enable successive CPC without re-initiation or reconfiguration at each time. By RRC reconfiguration messages from the serving MN, the reserved PSCell list and the associated CPA/CPC configuration as well as the configuration of the associated SCGs can also be updated via addition/modification/release.

Alternatively, the MN can select one or more PSCells from the reserved PSCell pool for each CPC operation, by indicating the selected PSCell identities or the associated condReconfigId in an RRC reconfiguration message or a MAC CE (634). Upon configuration of a reserved PSCell, the PSCell can be indicated explicitly or implicitly as selected or not in an RRC reconfiguration message or in the PSCell CPAC Selection MAC CE.

The UE can evaluate CPA/CPC execution conditions for the selected PSCells and perform CHO for the selected PSCells. The UE can also perform PSCell addition/change if only one candidate PSCell is selected and indicated in the RRC message or MAC CE, and apply the stored configuration for the PSCell and the associated SCG. A maximum number of selected PSCells can be pre-configured. The UE can also receive a PSCell addition/change command in an RRC message or in a MAC CE for an addition/a change to a target PSCell among the reserved PSCells, and the UE applies the target PSCell and associated SCG configuration retrieved from the stored variable. The MAC CE subheader can contain an eLCID (extended Logical Channel ID) field and the payload contains at least one of the selected PSCell identities and a transmission or reception beam information.

For CHO, a similar mechanism can be applied to reduce signaling overhead. For one embodiment, upon the source gNB sends an RRC reconfiguration message to the UE containing the configuration of CHO candidate PCells and CHO execution conditions, a subset of PCells from the candidate PCells can be configured as reserved so that the associated execution conditions and configurations are maintained and stored by the UE. For the reserved PCells, the UE does not release the CHO execution condition, the associated measurement configuration, nor the cell configuration, but can apply the stored CHO configuration for subsequent PCell changes. The source gNB can send delta CHO configuration by RRC reconfiguration message to update the reserved CHO configuration.

Alternatively, the MN can select one or more PCells from the reserved PCell pool for each CHO operation, by indicating the selected PCell identities or the associated condReconfigId in an RRC reconfiguration message or a MAC CE (634). Upon configuration of a reserved PCell, the PCell can be indicated explicitly or implicitly as selected or not in an RRC reconfiguration message or in a MAC CE. The UE can evaluate CHO execution conditions for the selected PCells and perform CHO for the selected PCells. The UE can also perform PCell change if only one candidate PCell is selected and indicated in the RRC message or MAC CE, and apply the stored configuration for the PCell and the associated MCG.

A maximum number of selected PCells can be pre-configured. The UE can also receive a PCell change command in an RRC message or in a MAC CE for a change to a target PCell among the reserved PCells, and the UE applies the target PCell, and associated MCG configuration retrieved from the stored variable. The MAC CE subheader can contain an extended logical channel ID (eLCID) field and the payload contains at least one of the selected PCell identities and a transmission or reception beam information.

Figure 7:
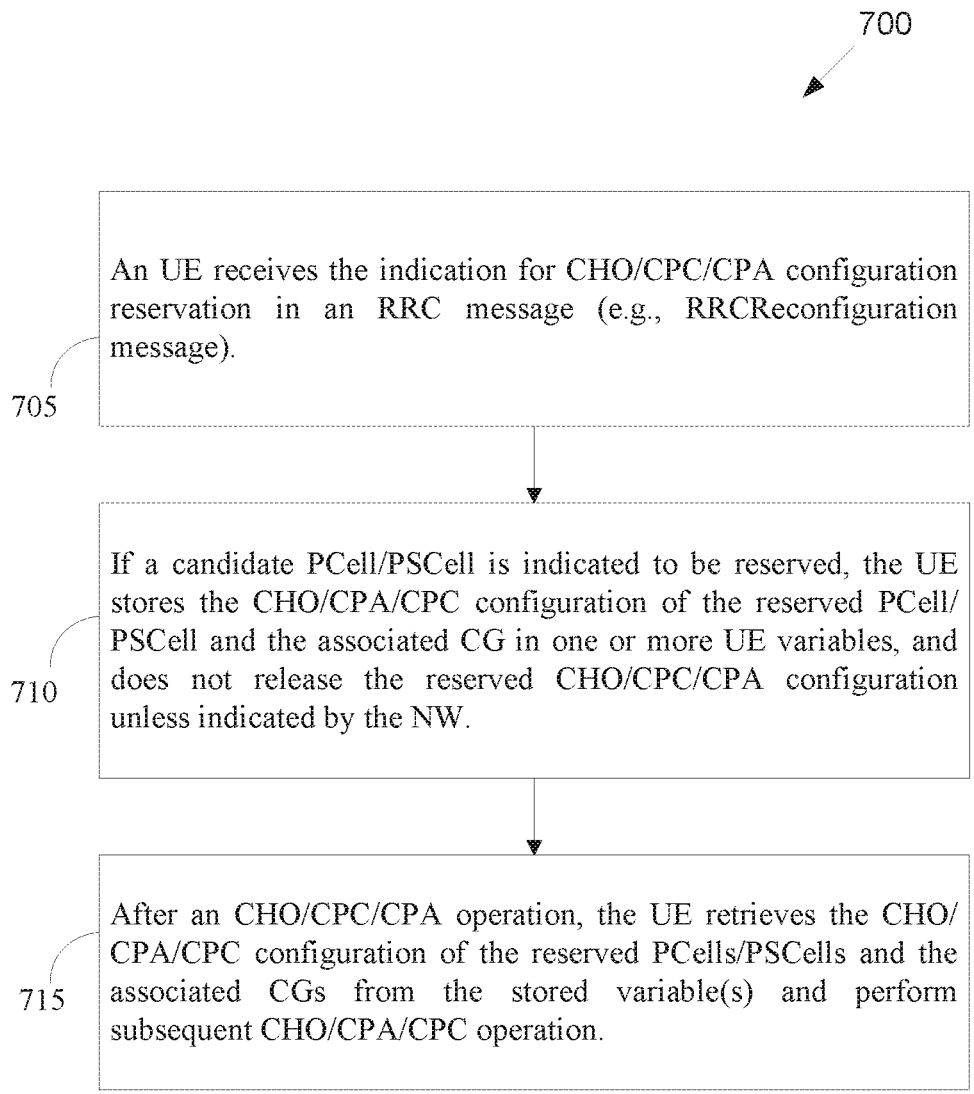
FIG. 7 illustrates a flowchart of a method for a UE behavior for enhanced conditional PSCell addition/changes according to embodiments of the present disclosure.

FIG. 7 illustrates a flowchart of a method for a UE behavior for enhanced conditional PSCell addition/changes. The method 700 as may be performed by a UE (e.g., 111-116 as illustrated in FIG. 1). An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

FIG. 7 illustrates an embodiment of UE behavior for enhanced CHO/CPC/CPA. At operation 705, a UE receives the indication for CHO/CPC/CPA configuration reservation in an RRC message (e.g., RRCReconfiguration message). At operation 710, if a candidate PCell/PSCell is indicated to be reserved, the UE stores the CHO/CPA/CPC configuration of the reserved PCell/PSCell and the associated CG in one or more UE variables, and does not release the reserved CHO/CPC/CPA configuration unless indicated by the NW. The CHO/CPC/CPA configuration can include the execution condition to be evaluated before HO execution and/or the candidate cell configuration to be applied for HO. At operation 715, after a CHO/CPC/CPA operation, the UE retrieves the CHO/CPA/CPC configuration of the reserved PCells/PSCells and the associated CGs from the stored variable and perform subsequent CHO/CPA/CPC operation.

3GPP has developed technical specifications and standards to define the new 5G radio-access technology, known as 5G NR. Mobility handling is a critical aspect in any mobile communication system including 5G system. For a UE in a connected mode, mobility is controlled by the network with the assistance from the UE to maintain a good quality of connection. Based on the measurement on radio link quality of the serving cell and neighboring cell(s) reported by the UE, the network may handover the UE to a neighboring cell that can provide better radio conditions when the UE is experiencing a degraded connection to the serving cell. For mobility in a connected mode, the handover is initiated by the network via a higher layer signaling, e.g., an RRC message, based on layer 3 (L3) measurements. However, this procedure involves more latency, signaling overhead and interruption time that may become the key issue in some scenarios with frequent handover, e.g., a UE in a high-speed vehicular and in frequency range 2 (FR2) deployment. Reduction on overhead and/or latency and interruption time in handover procedure is necessary.

In release-17 NR, enhancements to dual connectivity scenarios are provided. Specifically, the energy consumption to maintain two radio link simultaneously for dual connectivity is large. The mechanism of SCG activation and deactivation is introduced in release-17 NR to reduce energy consumption for the network and the UE when data rate requirement changes dynamically. While the SCG is deactivated, the UE may not transmit uplink data or reference signals to the SCG, and the UE is not required to monitor PDCCH on SCG. However, the activation and deactivation mechanism only applies to the single SCG configured by RRC layer. However, the SCG change by RRC layer can be slow. To enable fast SCG change, multiple SCGs can be pre-configured, and dynamically activated/deactivated based on the channel measurements. The described procedure can also be applied to MCG.

To enable fast change of MCG and SCG and reduce interruption in handover and SN addition/change, the procedure of handover and SN addition/change need to be enhanced.

In the present disclosure, a cell group (CG) activation/deactivation mechanism to be applied in handover and SN addition/change procedure is provided. Specifically, a CG pool can be configured for a set of candidate target cells, from which the target PCell/PSCell can be activated dynamically for handover or SN addition/change. The CG activation/deactivation enables dynamic MCG/SCG change for a UE moving in a certain area covered by a set of CGs. The handover to a target PCell or PSCell change can be triggered by the CG activation/deactivation command whenever the UE moves out of the area covered by the source MCG/SCG and moves into the area covered by the target MCG/SCG so that interruption and signaling among the UE, a source gNB, and a target gNB is reduced.

Figure 8:
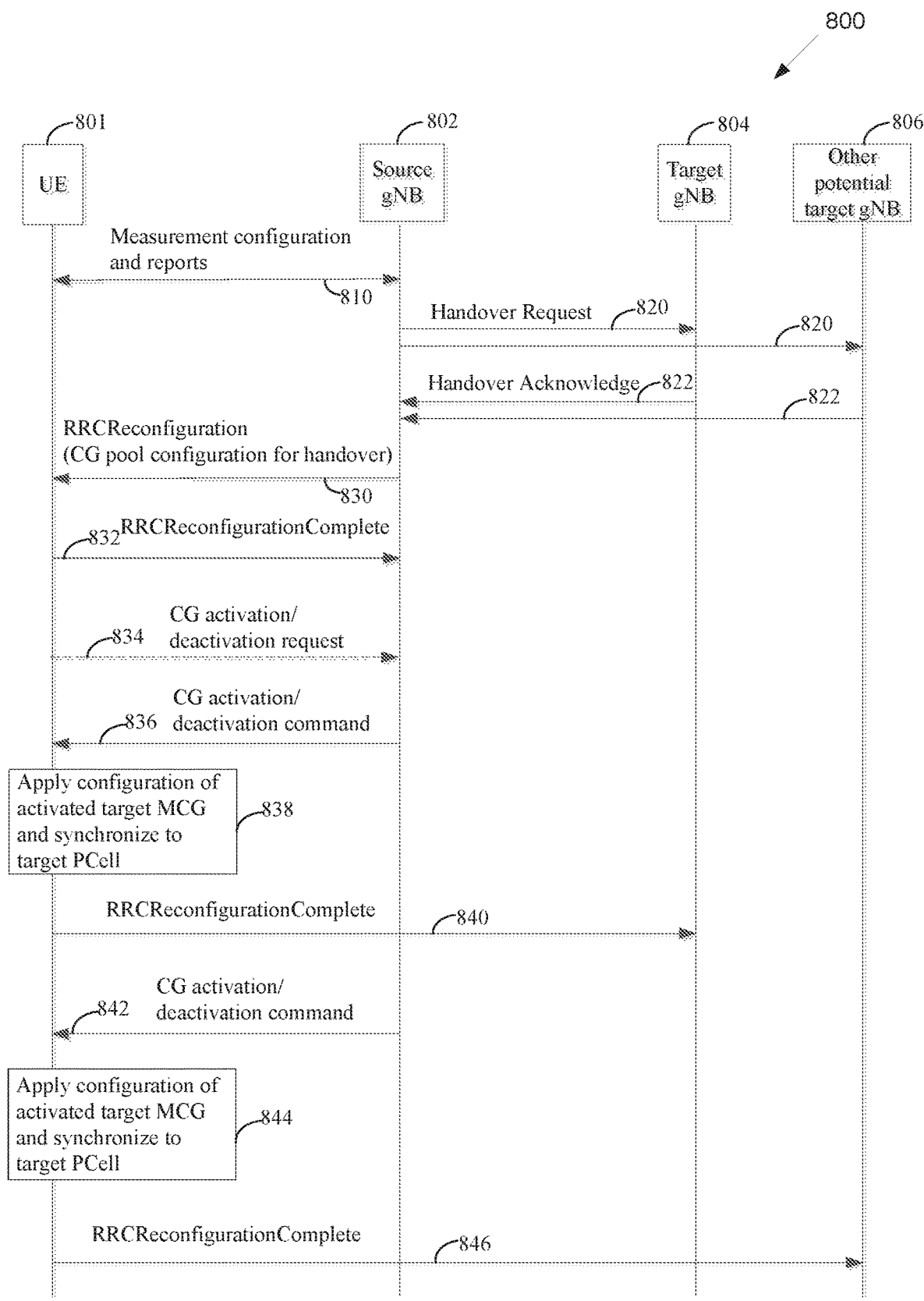
FIG. 8 illustrates a signaling flow of method for a handover with CG activation/deactivation according to embodiments of the present disclosure.

FIG. 8 illustrates a flowchart of method 800 for a handover with CG activation/deactivation according to embodiments of the present disclosure. The method 800 as may be performed by a UE (e.g., 111-116 as illustrated in FIG. 1) and a BS (e.g., 101-103 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 illustrates an embodiment of the handover procedure for UE 801, involving a source gNB 802, a target gNB 804, and other potential target gNB 806.

AS illustrated in FIG. 8, for 810, the source gNB 802 configures the measurement procedure and the UE 801 reports according to the measurement configuration.

For 820, the source gNB 802 determines candidate target gNBs based on measurement results and issues a handover request message to the target gNB 804 and other potential target gNB 806 passing a transparent RRC container with necessary information to prepare the handover at the target side. The information includes for example the target cell ID, the C-RNTI of the UE in the source gNB, an RRM-configuration including UE inactive time, basic AS-configuration including antenna Info and DL carrier frequency, the current quality of service (QoS) flow to data radio bearer (DRB) mapping rules applied to the UE, the system information block 1 (SIB1) from the source gNB, the UE capabilities for different radio access technologies (RATs), PDU session related information, and can include the UE reported measurement information including beam-related information if available.

For 822, the target gNB 804/806 prepares the handover with L1/L2 and sends the Handover Request Acknowledge message to the source gNB 802, which includes a transparent container to be sent to the UE 801 as an RRC message to perform the handover.

For 830, the source gNB 802 sends an RRCReconfiguration message to the UE 801 containing CG pool configuration for handover. The CG pool configuration includes a list of encapsulated RRCReconfiguration messages from all candidate target gNBs for potential handover. The information for target gNB access can include the target cell ID, the new C-RNTI, a set of dedicated RACH resources, the association between RACH resources and SSB(s), the association between RACH resources and UE-specific CSI-RS configuration(s), common RACH resources, and system information of the target cell, etc. The CGs configured in the CG pool are deactivated by default unless indicated as activated.

For 832, the UE 801 applies the RRC configuration, stores the CG pool configuration, and replies to the source gNB 802 by sending an RRCReconfigurationComplete message.

For 836, the source gNB 802 sends the CG activation/deactivation command to trigger handover to the target gNB 804 based on measurement results or according to the UE request if an activation/deactivation request 834 is received. In the CG activation/deactivation command, the source gNB 802 indicates the target MCG to be activated by e.g., including the CG ID or the PCell ID, and deactivates all the other MCGs in the CG pool explicitly or implicitly.

For 838, the UE 801 applies the configuration of the activated target MCG and synchronizes to the PCell of the activated target MCG by random access procedure.

For 840, the UE 801 completes the handover by sending an RRCReconfigurationComplete message to the target gNB 804 if the random access procedure to the target gNB 804 is successfully completed.

For 842, the source gNB 802 sends the CG activation/deactivation command to trigger handover to another target gNB 806 based on measurement results or according to the UE request if an activation/deactivation request 834 is received. In the CG activation/deactivation command, the source gNB 802 indicates the target MCG to be activated by e.g., including the CG ID or the PCell ID, and deactivates the current serving MCG and all the other MCGs in the CG pool explicitly or implicitly. While the MCG is deactivated, the UE may not transmit uplink data and reference signals to the PCell associated with the deactivated MCG, and the UE is not required to monitor PDCCH on MCG. If configured by the network, the UE performs radio link monitor while the MCG is deactivated for potential re-activation.

For 844, the UE 801 applies the configuration of the activated target MCG and synchronizes to the PCell of the target MCG by random access procedure. If the UE 801 is still synchronized to the target PCell, i.e., timeAlignmentTimer for the target PCell is running due to any previous activation/deactivation of the target PCell, the UE can access to the target PCell without random access procedure and directly communicates to the target PCell according to the TCI states.

For 846, the UE 801 completes the handover by sending an RRCReconfigurationComplete message to the target gNB 806.

The CG activation/deactivation request/command can be sent via an RRC message or MAC CE. The CG activation/deactivation MAC CE subheader can contain an eLCID (extended logical channel ID) field and the payload contains at least the activated or the deactivated MCG ID, alternatively the associated PCell/PSCell IDs.

Figure 9:
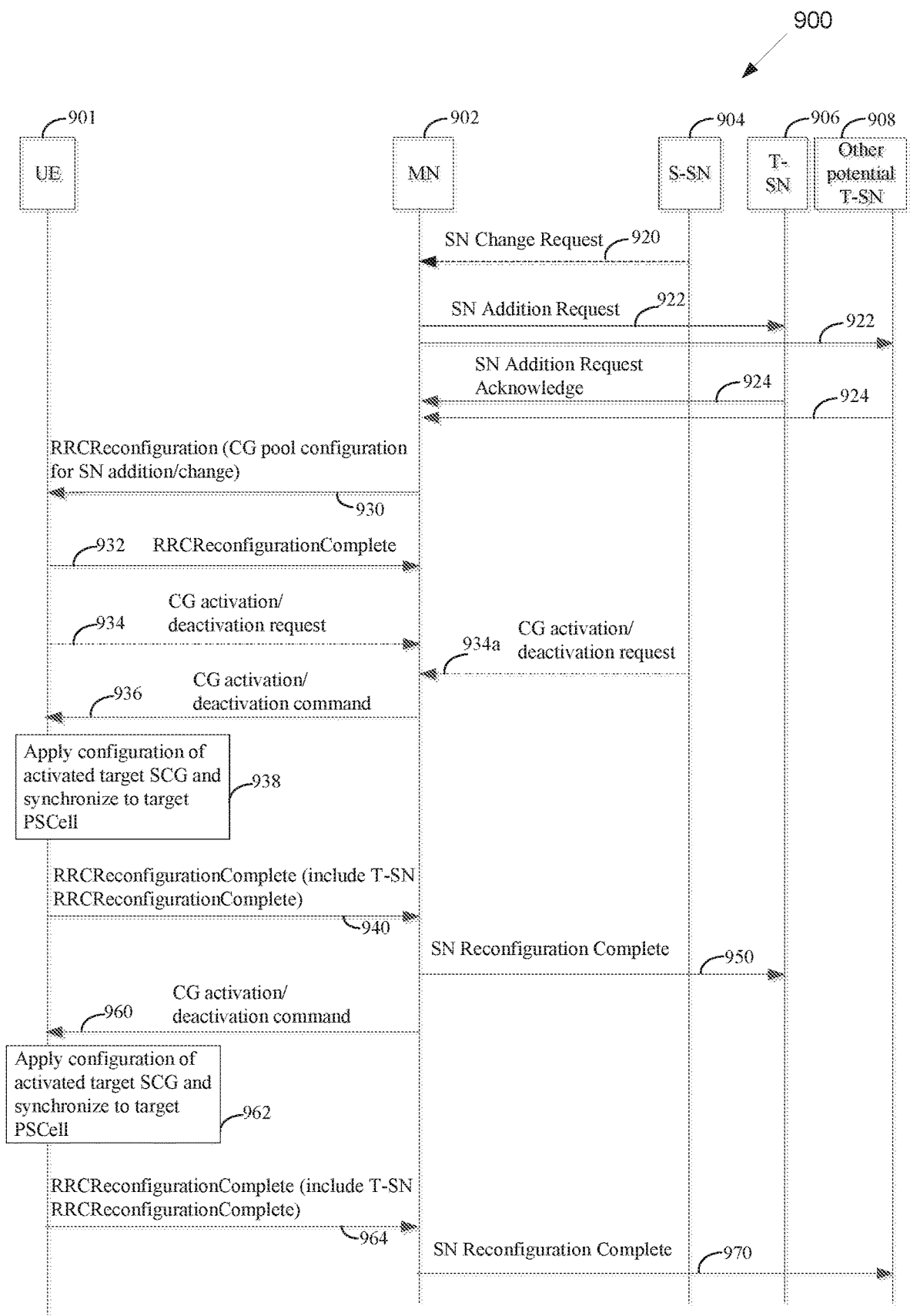
FIG. 9 illustrates a signaling flow of method for SN addition/change with CG activation/deactivation according to embodiments of the present disclosure.

FIG. 9 illustrates a flowchart of method 900 for SN addition/change with CG activation/deactivation according to embodiments of the present disclosure. The method 800 as may be performed by a UE (e.g., 111-116 as illustrated in FIG. 1) and a BS (e.g., 101-103 as illustrated in FIG. 1). An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 illustrates an embodiment of the SN addition/change procedure for a UE 901, involving an MN 902, a source SN 904, a target SN 906, and another potential target SN 908.

The SN change can be initiated by the MN 902 or the source SN 904. If the source SN 904 initiates the SN change procedure, a SN change request message 920 is sent to the MN 902. The message contains a candidate target node ID and may include the SCG configuration and measurement results related to the target SN.

If the MN 902 initiates the SN change procedure, the SN change request message 920 is omitted. The MN 902 initiates the SN addition/change by sending the SN addition request message 922 to the target SN 806 and other potential SN 908 to request resource allocation for the UE 901. The MN 902 may include measurement results related to the target SN 906/908 and indicates the list of PSCells that may be prepared by the MN 902. Within the list of PSCells indicated by the MN 802, the target SN 906/908 decides the list of PSCell(s) to prepare and, for each prepared PSCell, the target SN 906/908 decides other SCG secondary cells (SCells) and provides the corresponding SCG configuration to the MN 902 by sending the SN addition request acknowledge message 924.

For 930, the MN 902 sends an RRC reconfiguration message to the UE 901 including the CG pool configuration for SN addition/change. The CG pool configuration includes a list of encapsulated RRC reconfiguration messages received from all candidate target SNs 906/908. Besides, the RRC reconfiguration message can also include the current MCG updated configuration. The information for target SN access can include the target PSCell ID, the new C-RNTI, a set of dedicated RACH resources, the association between RACH resources and SSB(s), the association between RACH resources and UE-specific CSI-RS configuration(s), common RACH resources, and system information of the target cell, etc. The CGs configured in the CG pool are deactivated by default unless indicated as activated.

For 932, the UE 901 applies the RRC configuration, stores the CG pool configuration, and replies to the source gNB 902 by sending an RRCReconfigurationComplete message.

For 936, the source gNB 902 sends the CG activation/deactivation command to trigger SN addition/change to the target SN 904 based on periodical or event-triggered reporting of measurement results or according to the UE request if an activation/deactivation request 934 is received or according to the source SN request if an activation/deactivation request 934a is received. In the CG activation/deactivation command, the MN 902 indicates the target SCG to be activated by e.g., including the CG ID or the PSCell ID or SCG configuration ID, and deactivates all the other SCGs in the CG pool explicitly or implicitly.

For 938, the UE 901 applies the configuration of the activated target SCG and synchronizes to the PSCell of the activated target SCG by random access procedure.

For 940, the UE 901 completes the SN addition/change by sending an RRC reconfiguration complete message to the MN 902, including an RRC reconfiguration complete message to the target SN 906. For 950, the MN 902 informs the target SN 906 via an SN reconfiguration complete message.

For 960, the source gNB 902 sends the CG activation/deactivation command to trigger SN change to another target gNB 908 based on measurement results or according to the UE request if an activation/deactivation request 934 is received or according to the source SN request if an activation/deactivation request 934a is received. In the CG activation/deactivation command, the source gNB 902 indicates the target SCG to be activated by e.g., including the CG ID or the PCell ID, and deactivates the current serving SCG and all the other SCGs in the CG pool explicitly or implicitly. While the SCG is deactivated, the UE may not transmit uplink data and reference signals to the PSCell associated with the deactivated SCG, and the UE is not required to monitor PDCCH on SCG. If configured by the network, the UE performs radio link monitor while the SCG is deactivated for potential re-activation.

For 962, the UE 901 applies the configuration of the activated target SCG and synchronizes to the PSCell of the target SCG by random access procedure. If the UE 901 is still synchronized to the target PSCell, i.e., timeAlignment-Timer for the target PSCell is running due to any previous activation/deactivation of the target PSCell, the UE can access to the target PSCell without random access procedure and directly communicates to the target PSCell according to the TCI states.

For 964, the UE 901 completes the SN addition/change by sending an RRC reconfiguration complete message to the MN 902, including an RRC reconfiguration complete message to the target SN 808. For 970, the MN 902 informs the target SN 908 via an SN reconfiguration complete message.

The CG activation/deactivation request/command between the UE and the MN can be sent via an RRC message or MAC CE. The CG activation/deactivation MAC CE subheader can include an eLCID (extended logical channel ID) field or an LCD field and the payload contains at least the activated or the deactivated SCG ID(s), or alternatively the associated PCell/PSCell IDs, and/or the corresponding configuration ID(s). The SCG activation/deactivation command can also include the beam indication, e.g., TCI states, to be applied to communicate with the PSCell of the activated SCG. The CG activation/deactivation request from the SN to the MN can be sent via an inter-node message. A common CG pool can be configured for both MCGs and SCGs or separate CG pools can be configured for MCGs and SCGs independently.

Figure 10:
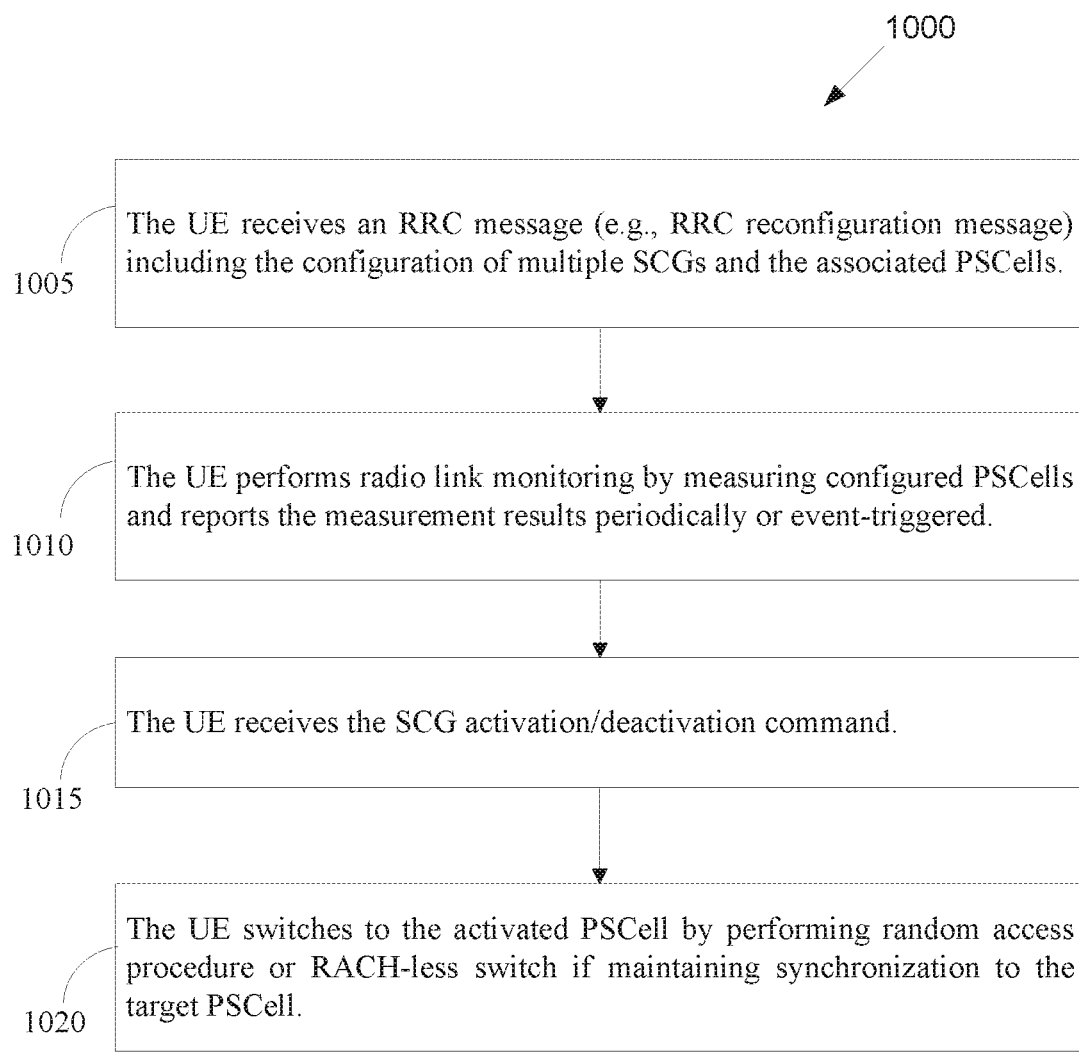
FIG. 10 illustrates a flowchart of method for a UE behavior for SCG activation/deactivation according to embodiments of the present disclosure.

FIG. 10 illustrates a flowchart of a method 1000 for UE behavior for SCG activation/deactivation according to embodiments of the present disclosure. The method 1000 as may be performed by a UE (e.g., 111-116 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

FIG. 10 illustrates an embodiment of UE behavior for SCG activation/deactivation operation. At operation 1005, the UE receives an RRC message (e.g., RRC reconfiguration message) including the configuration of multiple SCGs and the associated PSCells. Each PSCell configuration can include one or more of the measurement and reporting configuration, TCI state configuration, the configuration for activation with random access procedure, and the configuration for RACH-less activation. At operation 1010, the UE performs radio link monitoring by measuring configured PSCells and reports the measurement results periodically or event-triggered. At operation 1015, the UE receives the SCG activation/deactivation command. At operation 1020, the UE switches to the activated PSCell by performing random access procedure or RACH-less switch if maintaining synchronization to the target PSCell.

Figure 11:
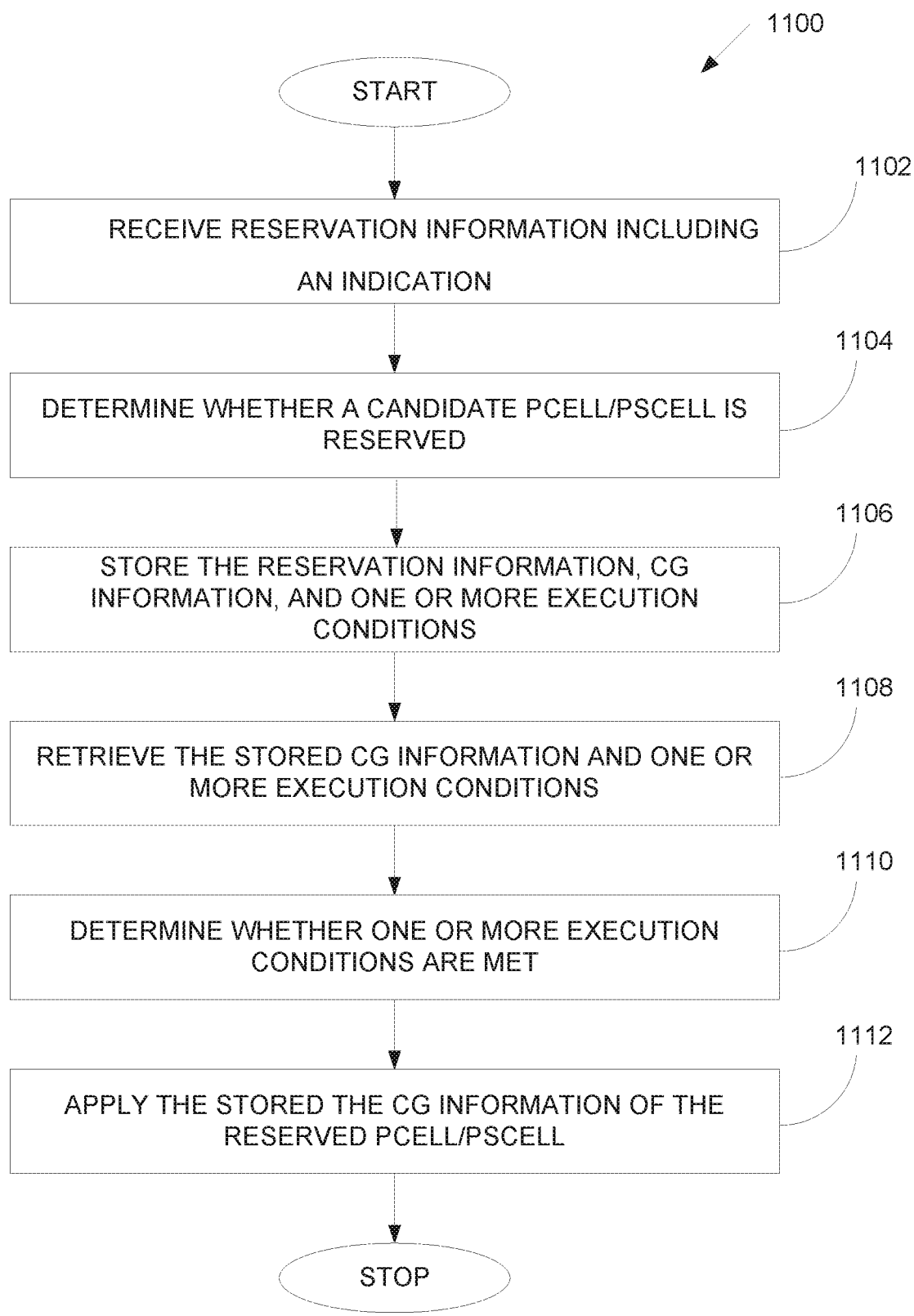
FIG. 11 illustrates a flowchart of method for enhanced conditional PSCell addition and changes according to embodiments of the present disclosure.

FIG. 11 illustrates a flowchart of method 1100 for enhanced conditional PSCell addition and changes according to embodiments of the present disclosure. The method 1100 as may be performed by a UE (e.g., 111-116 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, the method 1100 begins at step 1102. In step 1102, a UE receives reservation information including an indication.

In step 1104, the UE determines, based on the indication, whether a candidate PCell/PSCell is reserved.

In step 1106, the UE stores, based on a determination that the candidate PCell/PSCell is reserved, the reservation information, CG information and one or more execution conditions associated with the reserved PCell/PSCell.

In step 1108, the UE retrieves, after performing a first UE operation, the stored CG information and one or more execution conditions associated with the reserved PCell/PSCell.

In step 1110, the UE determines whether one or more execution conditions are met for a reserved PCell/PSCell.

In step 1112, the UE, upon determination that one or more execution conditions are met, applies the stored the CG information of the reserved PCell/PSCell to a second UE operation. In such step, the first and second UE operations include at least one of a CHO operation, a CPA operation, or a conditional PSCell change operation.

In one embodiment, the UE receives, from a BS, a release or update indication and releases or updates, based on the release or update indication, at least one of the stored reservation information, the CG information, and one or more execution conditions.

In such embodiment, wherein the indication included in the reservation information includes an information field indicating a reservation state of the candidate PCell/PSCell.

In such embodiment, the indication included in the reservation information includes an information field indicating a list of cell IDs or configuration IDs to add, modify, or release.

In one embodiment, the UE receives, via an RRC message or a MAC CE, a command to add or change a PCell/PSCell for a target PCell/PSCell among PCell/PSCells that are reserved by the indication, and applies the stored CG information associated with the target PCell/PSCell.

In such embodiment, the command includes at least one of an eLCID field, a PCell/PSCell ID field, and a transmission or reception of beam information.

In one embodiment, the UE receives, via an RRC message, configuration information for multiple SCGs and PSCells, monitors a radio link by measuring the PSCells, and transmits, to a BS, information indicating a measurement result of the radio link periodically or based on an event-triggered.

In one embodiment, the UE transmits, to a BS, a SCG activation and deactivation request, receives, from the BS, a SCG activation and deactivation command corresponding to the SCG activation and deactivation request, and switches, based on the SCG activation and deactivation command, to a PSCell by performing a random access procedure or a RACH-less switching operation, wherein, the SCG activation and deactivation command is an MAC CE including at least one of an eLCID field, a PSCell ID field, or a TCI state ID field.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver configured to receive reservation information including an indication, wherein the indication includes a configuration identifier (ID) of secondary cell group (SCG) for indicating a configuration status of the SCG; and
   a processor operably coupled to the transceiver, the processor configured to:
      determine, based on the indication, whether a candidate primary cell or primary secondary cell (PCell/PSCell) is reserved;
      store, based on a determination that the candidate PCell/PSCell is reserved, the reservation information, cell group (CG) information, and one or more execution conditions associated with the reserved PCell/PSCell;
      retrieve, after performing a first UE operation, the stored CG information and the one or more execution conditions associated with the reserved PCell/PSCell;
      determine whether the one or more execution conditions are met for a reserved PCell/PSCell; and
      upon determination that the one or more execution conditions are met, apply the stored CG information of the reserved PCell/PSCell to a second UE operation.

2. The UE of claim 1, wherein the first and second UE operations include at least one of a conditional handover (CHO) operation, a conditional PSCell addition (CPA) operation, and a conditional PSCell change operation.

3. The UE of claim 1, wherein:
   the transceiver is further configured to receive, from a base station (BS), a release or update indication; and
   the processor is further configured to release or update, based on the release or update indication, at least one of the stored reservation information, the CG information, and the one or more execution conditions.

4. The UE of claim 1, wherein the indication included in the reservation information further includes an information field indicating a reservation state of the candidate PCell/PSCell.

5. The UE of claim 1, wherein the indication included in the reservation information further includes an information field indicating a list of cell IDs or configuration IDs to add, modify, or release.

6. The UE of claim 1, wherein:
   the transceiver is further configured to receive, via a radio resource control (RRC) message or a medium access control control element (MAC CE), a command to add or change a PCell/PSCell for a target PCell/PSCell among PCells/PSCells that are reserved by the indication; and
   the processor is further configured to apply the stored CG information associated with the target PCell/PSCell.

7. The UE of claim 6, wherein the command includes at least one of an extended logical channel ID (eLCID) field, a PCell/PSCell ID field, and a transmission or reception beam information.

8. The UE of claim 1, wherein:
   the transceiver is further configured to receive, via a radio resource control (RRC) message, configuration information for multiple SCGs and PSCells;
   the processor is further configured to monitor a radio link by measuring the PSCells; and
   the transceiver is further configured to transmit, to a base station (BS), information indicating a measurement result of the radio link periodically or based on an event-triggered.

9. The UE of claim 1, wherein:
   the transceiver is further configured to transmit, to a base station (BS), a SCG activation and deactivation request;
   the transceiver is further configured to receive, from the BS, a SCG activation and deactivation command corresponding to the SCG activation and deactivation request;
   the processor is further configured to switch, based on the SCG activation and deactivation command, to a PSCell by performing a random access procedure or a random access channel-less (RACH-less) switching operation; and
   the SCG activation and deactivation command is a medium access control control element (MAC CE) including at least one of an extended logical channel ID (eLCID) field, a PSCell ID field, and a TCI state ID field.

10. A method of a user equipment (UE) in a wireless communication system, the method comprising:
   receiving reservation information including an indication including a configuration identifier (ID) of secondary cell group (SCG) for indicating a configuration status of the SCG;
   determining, based on the indication, whether a candidate primary cell or primary secondary cell (PCell/PSCell) is reserved;
   storing, based on a determination that the candidate PCell/PSCell is reserved, the reservation information, cell group (CG) information and one or more execution conditions associated with the reserved PCell/PSCell;

retrieving, after performing a first UE operation, the stored CG information and the one or more execution conditions associated with the reserved PCell/PSCell;

determining whether the one or more execution conditions are met for a reserved PCell/PSCell; and upon determination that the one or more execution conditions are met, applying the stored CG information of the reserved PCell/PSCell to a second UE operation.

11. The method of claim 10, wherein the first and second UE operations include at least one of a conditional handover (CHO) operation, a conditional PSCell addition (CPA) operation, and a conditional PSCell change operation.

12. The method of claim 10, further comprising:
receiving, from a base station (BS), a release or update indication; and
releasing or updating, based on the release or update indication, at least one of the stored reservation information, the CG information, and the one or more execution conditions.

13. The method of claim 10, wherein the indication included in the reservation information further includes an information field indicating a reservation state of the candidate PCell/PSCell.

14. The method of claim 10, wherein the indication included in the reservation information further includes an information field indicating a list of cell IDs or configuration IDs to add, modify, or release.

15. The method of claim 10, further comprising:
receiving, via a radio resource control (RRC) message or a medium access control control element (MAC CE), a command to add or change a PCell/PSCell for a target PCell/PSCell among PCell/PSCells that are reserved by the indication; and
applying the stored CG information associated with the target PCell/PSCell.

16. The method of claim 15, wherein the command includes at least one of an extended logical channel ID (eLCID) field, a PCell/PSCell ID field, and a transmission or reception of beam information.

17. The method of claim 10, further comprising:
receiving, via a radio resource control (RRC) message, configuration information for multiple SCGs and PSCells;
monitoring a radio link by measuring the PSCells; and
transmitting, to a base station (BS), information indicating a measurement result of the radio link periodically or based on an event-triggered.

18. The method of claim 10, further comprising:
transmitting, to a base station (BS), a SCG activation and deactivation request;
receiving, from the BS, a SCG activation and deactivation command corresponding to the SCG activation and deactivation request; and
switching, based on the SCG activation and deactivation command, to a PSCell by performing a random access procedure or a random access channel-less (RACH-less) switching operation,
wherein, the SCG activation and deactivation command is a medium access control control element (MAC CE) including at least one of an extended logical channel ID (eLCID) field, a PSCell ID field, and a TCI state ID field.

19. A base station (BS) in a wireless communication system, the BS comprising:
a processor configured to generate an indication indicating whether a candidate primary cell or primary secondary cell (PCell/PSCell) is reserved, wherein the indication includes a configuration identifier (ID) of secondary cell group (SCG) for indicating a configuration status of the SCG; and
a transceiver configured to transmit reservation information including the indication,
wherein:
based on the indication indicating that the candidate PCell/PSCell is reserved, the reservation information, cell group (CG) information, and one or more execution conditions associated with the reserved PCell/PSCell are stored by a user equipment (UE);
after performing a first UE operation, the stored CG information and one or more execution conditions associated with the reserved PCell/PSCell are retrieved; and
when one or more execution conditions are met for a reserved PCell/PSCell, the stored CG information of the reserved PCell/PSCell is applied to a second UE operation.

20. The BS of claim 19, wherein the transceiver is further configured to:
transmit, to the UE, a release or update indication;
transmit, via a radio resource control (RRC) message or a medium access control control element (MAC CE), a command to add or change a PCell/PSCell for a target PCell/PSCell among PCell/PSCells that are reserved by the indication;
transmit, via the RRC message, configuration information for multiple secondary cell groups (SCGs) and PSCells;
receive information indicating a measurement result of a radio link periodically or based on an event-triggered;
receive an SCG activation and deactivation request; and
transmit an SCG activation and deactivation command corresponding to the SCG activation and deactivation request,
wherein:
the first and second UE operations include at least one of a conditional handover (CHO) operation, a conditional PSCell addition (CPA) operation, and a conditional PSCell change operation,
the indication included in the reservation information further includes an information field indicating a reservation state of the candidate PCell/PSCell,
the indication included in the reservation information further includes an information field indicating a list of cell identifiers (IDs) or configuration IDs to add, modify, or release,
the command includes at least one of an extended logical channel ID (eLCID) field, a PCell/PSCell ID field, and a transmission or reception of beam information, and
the SCG activation and deactivation command is the MAC CE including at least one of the eLCID field, a PSCell ID field, and a TCI state ID field.

* * * * *